US009690696B1

(12) United States Patent
Hefner et al.

(10) Patent No.: US 9,690,696 B1
(45) Date of Patent: Jun. 27, 2017

(54) LIFETIME EXTENSION OF MEMORY FOR DATA STORAGE SYSTEM

(71) Applicant: Western Digital Technologies, Inc., Irvine, CA (US)

(72) Inventors: George B. Hefner, Rancho Santa Margarita, CA (US); David N. Steffen, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 248 days.

(21) Appl. No.: 14/307,408

(22) Filed: Jun. 17, 2014

Related U.S. Application Data

(60) Provisional application No. 61/993,053, filed on May 14, 2014.

(51) Int. Cl.
*G06F 12/02* (2006.01)
*G06F 3/06* (2006.01)

(52) U.S. Cl.
CPC ........ *G06F 12/0246* (2013.01); *G06F 3/0616* (2013.01); *G06F 3/0649* (2013.01); *G06F 2212/7202* (2013.01); *G06F 2212/7204* (2013.01); *G06F 2212/7208* (2013.01); *G06F 2212/7211* (2013.01)

(58) Field of Classification Search
CPC .... G06F 12/0246; G06F 12/12–12/128; G06F 2212/72–2212/7211; G06F 12/00–12/16; G06F 13/00–13/4295; G06F 3/0616; G06F 3/0646–3/0649
See application file for complete search history.

(56) References Cited

U.S. PATENT DOCUMENTS

| 6,856,556 | B1 | 2/2005 | Hajeck |
| 7,126,857 | B2 | 10/2006 | Hajeck |
| 7,430,136 | B2 | 9/2008 | Merry, Jr. et al. |
| 7,430,650 | B1 * | 9/2008 | Ross ................ G06F 12/0862 711/137 |
| 7,447,807 | B1 | 11/2008 | Merry et al. |
| 7,502,256 | B2 | 3/2009 | Merry, Jr. et al. |
| 7,509,441 | B1 | 3/2009 | Merry et al. |
| 7,596,643 | B2 | 9/2009 | Merry, Jr. et al. |

(Continued)

FOREIGN PATENT DOCUMENTS

| WO | 2009070196 | 6/2009 |
| WO | 2014059176 | 4/2014 |

OTHER PUBLICATIONS

Robert L. Horn, U.S. Appl. No. 13/110,639, filed May 18, 2011, 29 pages.

(Continued)

*Primary Examiner* — Nicholas Simonetti

(57) ABSTRACT

Memory lifetime extension for a data storage system having a first memory and a second memory includes determining a plurality of age-adjusted access values for a data block stored in the first memory based on access of the data block and at least one aging weight, determining an overall access value for the data block based on the plurality of age-adjusted access values, and determining if at least a portion of the data block should be stored in a cache memory of the second memory based on the overall access value. The at least one aging weight can be dynamically adjusted based on an expected remaining practical usable life of the second memory.

26 Claims, 12 Drawing Sheets

(56) References Cited

U.S. PATENT DOCUMENTS

| | | |
|---|---|---|
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,230,164 B2 | 7/2012 | Danilak |
| 8,230,183 B2 | 7/2012 | Danilak |
| 8,230,184 B2 | 7/2012 | Danilak |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,339,881 B2 | 12/2012 | Danilak |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,429,343 B1 | 4/2013 | Tsai |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,504,783 B1 | 8/2013 | Danilak |
| 8,516,166 B2 | 8/2013 | Stenfort |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2002/0053044 A1* | 5/2002 | Gold .................. G06F 11/1417 714/6.24 |
| 2008/0059694 A1 | 3/2008 | Lee |
| 2010/0174849 A1 | 7/2010 | Walston et al. |
| 2010/0250793 A1 | 9/2010 | Syu |
| 2011/0099323 A1 | 4/2011 | Syu |
| 2011/0283049 A1 | 11/2011 | Kang et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0095775 A1* | 4/2014 | Talagala ............. G06F 12/0866 711/103 |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0189196 A1* | 7/2014 | Kelkar .................. G06F 12/16 711/102 |
| 2014/0223255 A1 | 8/2014 | Lu et al. |
| 2015/0039837 A1* | 2/2015 | Quan ..................... G06F 3/061 711/136 |
| 2015/0317090 A1* | 11/2015 | Samanta ............. G06F 12/0246 711/103 |

OTHER PUBLICATIONS

Lu Ding, et al., U.S. Appl. No. 14/266,234, filed Apr. 30, 2014, 35 pages.

* cited by examiner

506

| Mapping Table ||||||
| Data Block # | Σ Plurality of Overall Access Values | Data Access Values ||||
| | | First Plurality of Access Values | Second Plurality of Access Values | Third Plurality of Access Values | Current Plurality of Access Values |
| --- | --- | --- | --- | --- | --- |
| n | 41 | 3 | 6 | 12 | 20 |
| ... | | | | | |
| 9 | 15 | 6 | 4 | 4 | 1 |
| 8 | 94 | 10 | 28 | 32 | 24 |
| 7 | 3 | 1 | 1 | 1 | 0 |
| 6 | 11 | 4 | 2 | 4 | 1 |
| 5 | 40 | 12 | 8 | 8 | 12 |
| 4 | 80 | 24 | 20 | 16 | 20 |
| 3 | 14 | 1 | 4 | 5 | 4 |
| 2 | 0 | 0 | 0 | 0 | 0 |
| 1 | 11 | 1 | 9 | 0 | 1 |
| 0 | 8 | 0 | 0 | 4 | 4 |

| Mapping Table | | | | | |
|---|---|---|---|---|---|
| | $\Sigma$ | Data Access Values | | | |
| Data Block # | Plurality of Overall Access Values | First Plurality of Access Values | Second Plurality of Access Values | Third Plurality of Access Values | Current Plurality of Access Values |
| n | 38 | | 6 | 12 | 20 |
| ... | | | | | |
| 9 | 9 | | 4 | 4 | 1 |
| 8 | 94 | | 28 | 32 | 24 |
| 7 | 2 | | 1 | 1 | 0 |
| 6 | 7 | | 2 | 4 | 1 |
| 5 | 28 | | 8 | 8 | 12 |
| 4 | 56 | | 20 | 16 | 20 |
| 3 | 13 | | 4 | 5 | 4 |
| 2 | 0 | | 0 | 0 | 0 |
| 1 | 10 | | 9 | 0 | 1 |
| 0 | 8 | | 0 | 4 | 4 |
| 508 | 518 | 510 | 512 | 514 | 516 |

| Mapping Table |||||||
|---|---|---|---|---|---|---|
| | Σ | Data Access Values |||||
| Data Block # | Plurality of Overall Access Values | First Plurality of Access Values | | Second Plurality of Access Values | Third Plurality of Access Values | Current Plurality of Access Values |
| n | 41 | 3 | | 6 | 12 | 20 |
| ... | | | | | | |
| 9 | 11 | 2 | | 4 | 4 | 1 |
| 8 | 98 | 14 | | 28 | 32 | 24 |
| 7 | 2 | 0 | | 1 | 1 | 0 |
| 6 | 8 | 1 | | 2 | 4 | 1 |
| 5 | 32 | 4 | | 8 | 8 | 12 |
| 4 | 66 | 10 | | 20 | 16 | 20 |
| 3 | 15 | 2 | | 4 | 5 | 4 |
| 2 | 0 | 0 | | 0 | 0 | 0 |
| 1 | 14 | 4 | | 9 | 0 | 1 |
| 0 | 8 | 0 | | 0 | 4 | 4 |
| ↑ | ↑ | ↑ | | ↑ | ↑ | ↑ |
| 508 | 518 | 510 | | 512 | 514 | 516 |

FIG. 9

| Mapping Table | | | | | |
|---|---|---|---|---|---|
| | Σ | Data Access Values | | | |
| Data Block # | Plurality of Overall Access Values | First Plurality of Access Values | Second Plurality of Access Values | Third Plurality of Access Values | Current Plurality of Access Values |
| n | 39 | 3 | 6 | 10 | 20 |
| ... | | | | | |
| 9 | 5 | 2 | 2 | 0 | 1 |
| 8 | 66 | 14 | 16 | 12 | 24 |
| 7 | 0 | 0 | 0 | 0 | 0 |
| 6 | 4 | 1 | 2 | 0 | 1 |
| 5 | 26 | 4 | 4 | 6 | 12 |
| 4 | 48 | 10 | 8 | 10 | 20 |
| 3 | 10 | 2 | 2 | 2 | 4 |
| 2 | 0 | 0 | 0 | 0 | 0 |
| 1 | 5 | 4 | 0 | 0 | 1 |
| 0 | 8 | 0 | 2 | 2 | 4 |

| Mapping Table | | | | | |
|---|---|---|---|---|---|
| | Σ | Data Access Values | | | |
| Data Block # | Plurality of Overall Access Values After Aging | First Plurality of Access Values | Second Plurality of Access Values | Third Plurality of Access Values | Current Plurality of Access Values |
| n | 19 | 3 | 6 | 10 | 0 |
| ... | | | | | |
| 9 | 4 | 2 | 2 | 0 | 0 |
| 8 | 42 | 14 | 16 | 12 | 0 |
| 7 | 0 | 0 | 0 | 0 | 0 |
| 6 | 3 | 1 | 2 | 0 | 0 |
| 5 | 14 | 4 | 4 | 6 | 0 |
| 4 | 28 | 10 | 8 | 10 | 0 |
| 3 | 6 | 2 | 2 | 2 | 0 |
| 2 | 0 | 0 | 0 | 0 | 0 |
| 1 | 4 | 4 | 0 | 0 | 0 |
| 0 | 4 | 0 | 2 | 2 | 0 |

LIFETIME EXTENSION OF MEMORY FOR DATA STORAGE SYSTEM

CROSS-REFERENCE TO RELATED APPLICATION(S)

This application claims the benefit of U.S. Provisional Application No. 61/993,053, filed on May 14, 2014, which is hereby incorporated by reference in its entirety.

BACKGROUND

Data storage systems are often used to record data onto or to reproduce data from a storage media. Some data storage systems include multiple types of storage media. The multiple types of storage media may be co-located or located remotely from one another. For example, the data storage system may be a data storage device (DSD) that includes at least a first memory and a second memory with a finite life. In the case of a solid-state hybrid drive (SSHD), the first memory may be a rotating magnetic disk for storing data, and the second memory may be a non-volatile semiconductor memory (NVSM) such as a solid-state drive (SSD), a flash memory, and/or a NAND memory utilized in addition to the first memory.

Data expected to be utilized again in the relatively near future can be written to and accessed from a discretionary storage such as a cache memory of the NVSM. However, a practical usable life of the NVSM is generally limited to a finite number of program erase cycles (PECs). The practical usable life of the NVSM deteriorates at a faster rate if the cache memory is accessed and written to at a higher frequency. This is particularly undesirable if the practical usable life of the NVSM ends before a certain predetermined time period. The predetermined time period may be, for example, a time period in the specification of a DSD, a warranty time period of the DSD, or any other predetermined expectation of a practical usable life of the NVSM.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 7 shows an example of the mapping table of FIG. 5 after determining a current plurality of access values according to an embodiment.

FIG. 8 shows an example of the mapping table of FIG. 5 after removing a first plurality of access values according to an embodiment.

FIG. 9 shows an example of the mapping table of FIG. 5 after adjusting a first plurality of access values based on an aging weight according to an embodiment.

FIG. 10 shows an example of the mapping table of FIG. 5 after adjusting first, second, and third plurality of access values based on at least one aging weight according to an embodiment.

FIG. 11 shows an example of the mapping table of FIG. 5 after removing a current plurality of access values according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
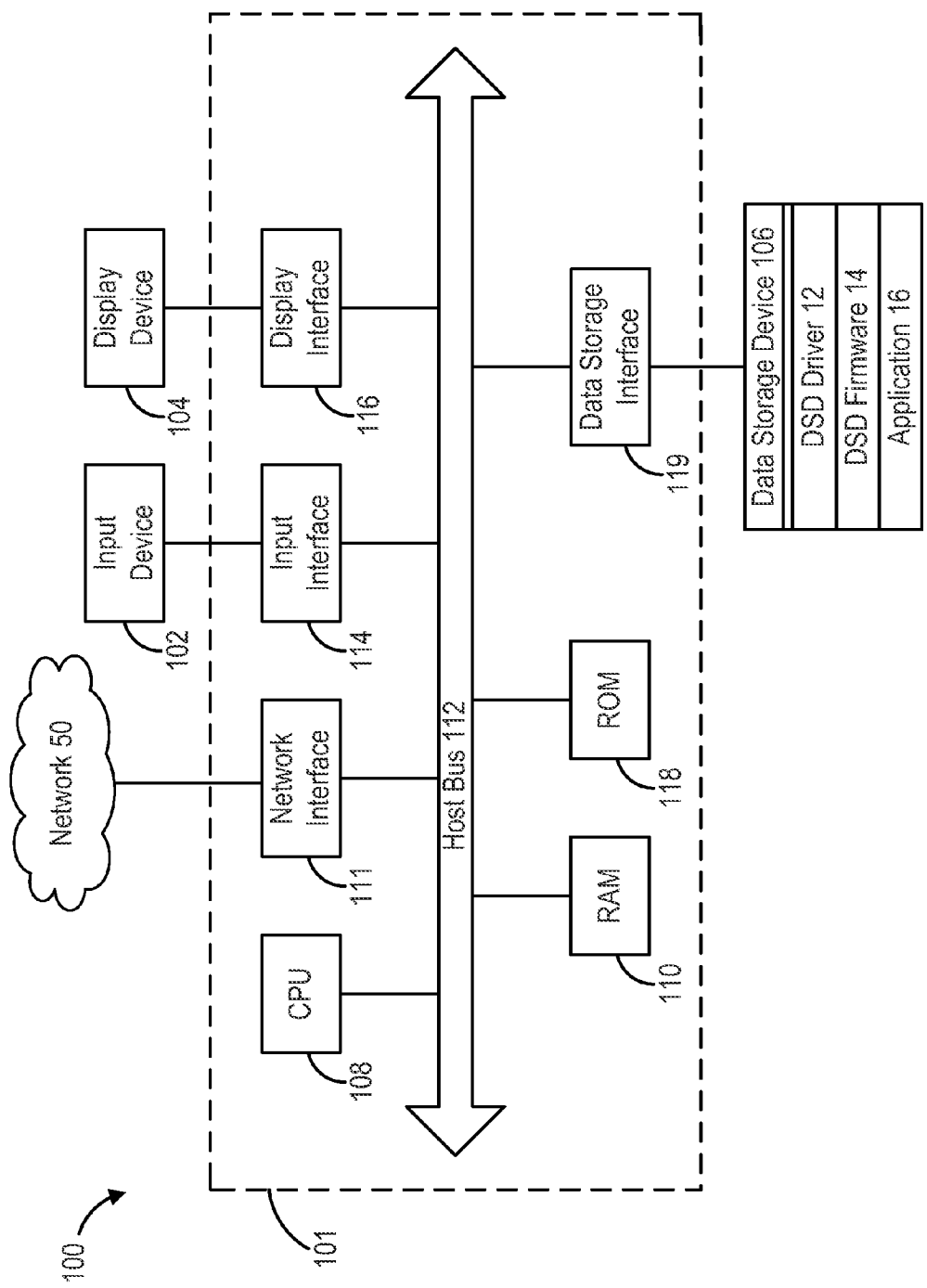
FIG. 1 is a block diagram depicting a system with a data storage device (DSD) according to an embodiment.

FIG. 1 shows system 100 according to an embodiment which includes host 101, input device 102, display device 104 and Data Storage Device (DSD) 106. System 100 can be, for example, a computer system (e.g., server, desktop, mobile/laptop, tablet, smartphone, etc.) or other electronic device such as a digital video recorder (DVR). In this regard, system 100 may be a stand-alone system or part of a network, such as network 50, which can, for example, be a local or wide area network or the Internet.

Those of ordinary skill in the art will appreciate that system 100 can include more or less than those elements shown in FIG. 1 and that the disclosed processes can be implemented in other environments Input device 102 can be a keyboard, scroll wheel, or pointing device allowing a user of system 100 to enter information and commands to system 100, or to allow a user to manipulate objects displayed on display device 104. In other embodiments, input device 102 and display device 104 can be combined into a single component, such as a touch-screen that displays objects and receives user input.

In the embodiment of FIG. 1, host 101 includes Central Processing Unit (CPU) 108 which can be implemented using one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. A processor of host 101 as referenced hereinafter can be one or more of the foregoing processors or another processor configured to perform functions described herein. CPU 108 interfaces with host bus 112. Also interfacing with host bus 112 are Random Access Memory (RAM) 110, input interface 114 for input device 102, display interface 116 for display device 104, Read Only Memory (ROM) 118, network interface 111, and data storage interface 119 for DSD 106.

RAM 110 is a volatile memory of host 101 that interfaces with host bus 112 to provide information stored in RAM 110 to CPU 108 during execution of instructions in software programs such as DSD driver 12 or application 16. More specifically, CPU 108 first loads computer-executable instructions from DSD 106 or another DSD into a region of RAM 110. CPU 108 can then execute the stored process instructions from RAM 110. Data such as data to be stored in DSD 106 or data retrieved from DSD 106 can also be stored in RAM 110 so that the data can be accessed by CPU 108 during execution of software programs to the extent that such software programs have a need to access and/or modify the data.

As shown in FIG. 1, DSD 106 can be configured to store one or more of: DSD driver 12, DSD firmware 14, and application 16. DSD driver 12 provides a software interface for DSD 106 on host 101. DSD firmware 14 includes computer-executable instructions for DSD 106 that control operation of DSD 106 when executed by a controller of DSD 106 (e.g., controller 120 in FIG. 2).

Application 16 can include, for example, a program used by host 101 as a tool for interfacing with DSD 106 or a portion of DSD 106. In one implementation, application 16 includes an application for a second memory of DSD 106 including a solid-state memory (i.e., non-volatile semiconductor memory (NVSM) 142 in FIG. 2) and a controller for the solid-state memory (i.e., controller 120 in FIG. 2). In such an implementation, use of application 16 can provide host 101 with diagnostic and use information about the solid-state memory of DSD 106. In other embodiments, application 16 includes specialized software installed for performing functions described herein.

Data storage interface 119 is configured to interface host 101 with DSD 106 and interfaces according to a Serial Advanced Technology Attachment (SATA) standard. In other embodiments, data storage interface 119 can interface with DSD 106 using other standards such as, for example, PCI express (PCIe) or Serial Attached SCSI (SAS).

Figure 2:
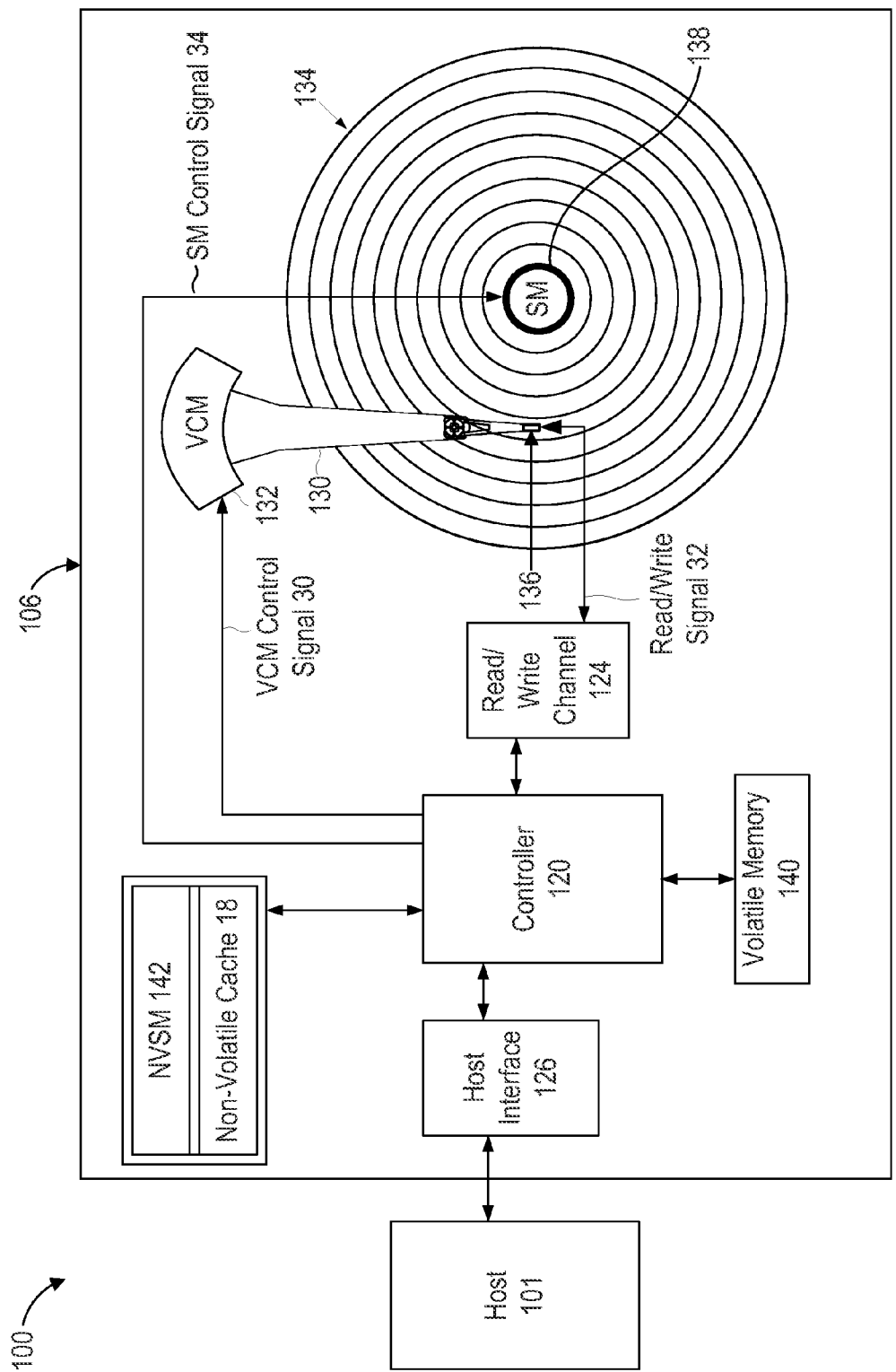
FIG. 2 is a block diagram depicting the DSD of FIG. 1 according to an embodiment.

FIG. 2 depicts a block diagram of DSD 106 according to an embodiment. In the embodiment of FIG. 2, DSD 106 is a solid-state hybrid drive (SSHD) with a first memory including magnetic recording media (e.g., disks in disk pack 134) and a second memory including a solid-state recording media (NVSM 142). In other embodiments, each of disk pack 134 or NVSM 142 may be replaced by multiple hard disk drives (HDDs) or multiple solid-state drives (SSDs), respectively, so that DSD 106 includes pools of HDDs and/or SSDs. In addition, the first and second memories in other embodiments can include different types of recording media. For example, in one embodiment, both the first memory and the second memory may include solid-state media without a magnetic recording media.

While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

DSD 106 includes controller 120 which includes circuitry such as one or more processors for executing instructions and can include a microcontroller, a DSP, an ASIC, an FPGA, hard-wired logic, analog circuitry and/or a combination thereof. In one implementation, controller 120 can include a system on a chip (SoC). In one embodiment, an NVSM controller may be utilized that operates in conjunction with controller 120.

Host interface 126 is configured to interface DSD 106 with host 101 and may interface according to a standard such as, for example, PCIe, SATA, or SAS. As will be appreciated by those of ordinary skill in the art, host interface 126 can be included as part of controller 120. Although FIGS. 1 and 2 depict the co-location of host 101 and DSD 106, in other embodiments the two need not be physically co-located. In such embodiments, DSD 106 may be located remotely from host 101 and connected to host 101 via a network interface.

In the example of FIG. 2, the first memory of DSD 106 includes rotating magnetic disks arranged in disk pack 134 which is rotated by spindle motor (SM) 138. DSD 106 also includes head stack assembly (HSA) 136 connected to the distal end of actuator 130 which is rotated by voice coil motor (VCM) 132 to position HSA 136 in relation to disk pack 134. Controller 120 can include servo control circuitry (not shown) to control the position of HSA 136 and the rotation of disk pack 134 using VCM control signal 30 and SM control signal 34, respectively. DSD 106 may include firmware stored on disk pack 134 and/or NVSM 142. Firmware can include computer-readable instructions used by DSD 106 to control the operation of DSD 106.

Disk pack 134 comprises multiple disks that are radially aligned so as to rotate about SM 138. Each disk in disk pack 134 includes a number of radially spaced, concentric tracks for storing data. HSA 136 includes multiple heads each arranged to read data from and write data to a corresponding surface of a disk in disk pack 134.

Data may also be stored in the second memory. The second memory may include NVSM 142 having non-volatile cache 18. In one embodiment, non-volatile cache 18 is used to store cached data which may be identical data to, or a most recent copy of, data for selected ranges of logical block addresses (LBAs) on the first memory (e.g., disk pack 134). Cached data can include data that is only stored in NVSM 142 and/or is a most recently written version of data for a particular logical address such as an LBA. Such cached data may be referred to as "dirty data," which is periodically synchronized with disk pack 134 by writing the dirty data to disk pack 134 for the logical address. In one example, dirty data may result from a deferred write operation where data intended to be written to disk pack 134 is first stored in the NVSM 142.

In other embodiments, a data storage system is utilized having at least a first memory and a second memory that includes a discretionary storage (e.g., a cache memory). The first memory may be co-located with the second memory or may be located remotely from the second memory. One or more processors (that may or may not be co-located) may transfer or copy data via a wireless or wired communication network between the first memory and the second memory. For example, the second memory may be any memory with a finite practical usable life. The second memory may include a discretionary storage (e.g., a cache memory). For example, the one or more processors control storing of data in the first memory and/or the second memory. For example, the one or more processors may control transfer or copying of data from the first memory to the discretionary storage of the second memory.

DSD 106 may also include volatile memory 140. Volatile memory 140 can include, for example, a dynamic random access memory (DRAM) which can be used by DSD 106 to temporarily store data. Data stored in volatile memory 140 can include data read from non-volatile memories (NVMs)

(which may include disk pack 134 and NVSM 142), data to be written to NVMs, instructions loaded from firmware for execution by controller 120, and/or data used in executing firmware.

In operation, host interface 126 receives host read and write commands from host 101 via host interface 126 for reading data from and writing data to NVMs such as the NVSM 142 and disk pack 134. In response to a write command from host 101, controller 120 may buffer the data to be written for the write command in volatile memory 140.

For data to be written to disk pack 134, a read/write channel (not shown) of controller 120 may then encode the buffered data into write signal 32 which is provided to a head of HSA 136 for magnetically writing data to a disk surface of disk pack 134.

In response to a read command for data stored on a disk surface of disk pack 134, controller 120 controls a head of HSA 136 to magnetically read data stored on the surface of disk pack 134 and to send the read data as read signal 32. Read/write channel 124 of controller 120 can then decode and buffer the data into volatile memory 140 for transmission to host 101 via host interface 126.

For data to be stored in NVSM 142, controller 120 receives data from host interface 126 and may buffer the data in volatile memory 140. In one implementation, the data is then encoded into charge values for charging cells (not shown) of NVSM 142 to store the data.

In response to a read command for data stored in NVSM 142, controller 120 in one implementation reads current values for cells in NVSM 142 and decodes the current values into data that can be transferred or copied to host 101. Such data may be buffered by controller 120 before transferring or copying the data to host 101 via host interface 126.

Figure 3:
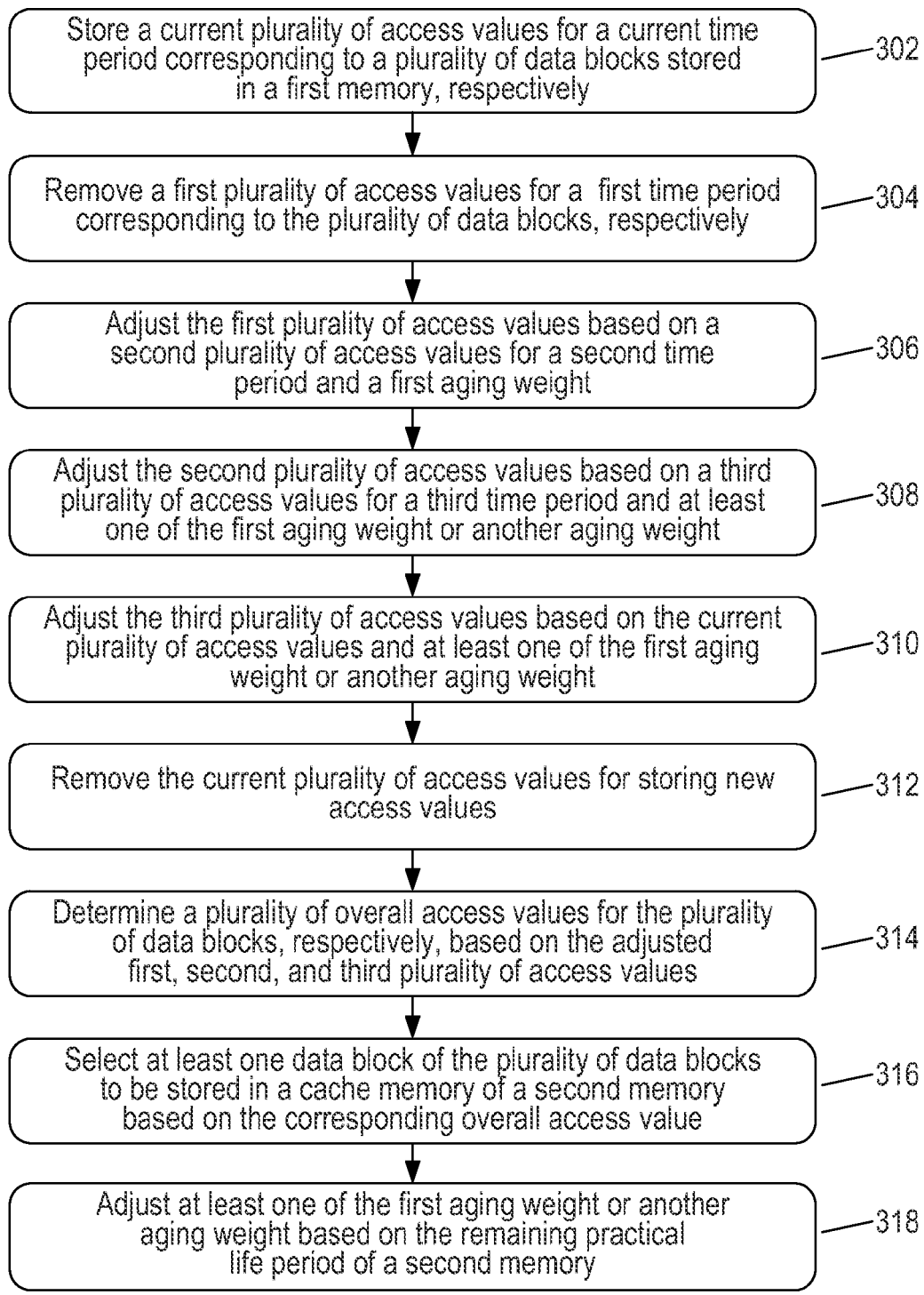
FIG. 3 is a flowchart depicting a memory life management process that adjusts a cache update rate using at least one aging weight according to an embodiment.

FIG. 3 is a flowchart diagram depicting a memory life management process that adjusts a cache update rate using at least one aging weight according to an embodiment. In block 302, the processor of host 101 stores a current plurality of access values for a plurality of data blocks 508, respectively, for a current time period. The plurality of data blocks 508 may be stored in the first memory (e.g., disk pack 134). The current time period may be, for example, a current day during which DSD 106 is used. Each data block can include one or more LBAs. Each of the current plurality of access values corresponds to a given data block 508.

One reason for keeping track of access values in more than one time period is that data access and user behavior can differ significantly from one time period to another. The processor remembers the use during previous time periods by keeping the data in cache memory 18 such that the stored old data can be accessed quickly. For example, the current time period may be today (e.g., Thursday). A third, a second, and a first time period may be yesterday (Wednesday), the day before yesterday (Tuesday), and 3 days ago (Monday). It may be desirable for cache memory 18 to retain data used 3 days ago (Monday) in the event that the data is accessed again.

Figure 5:
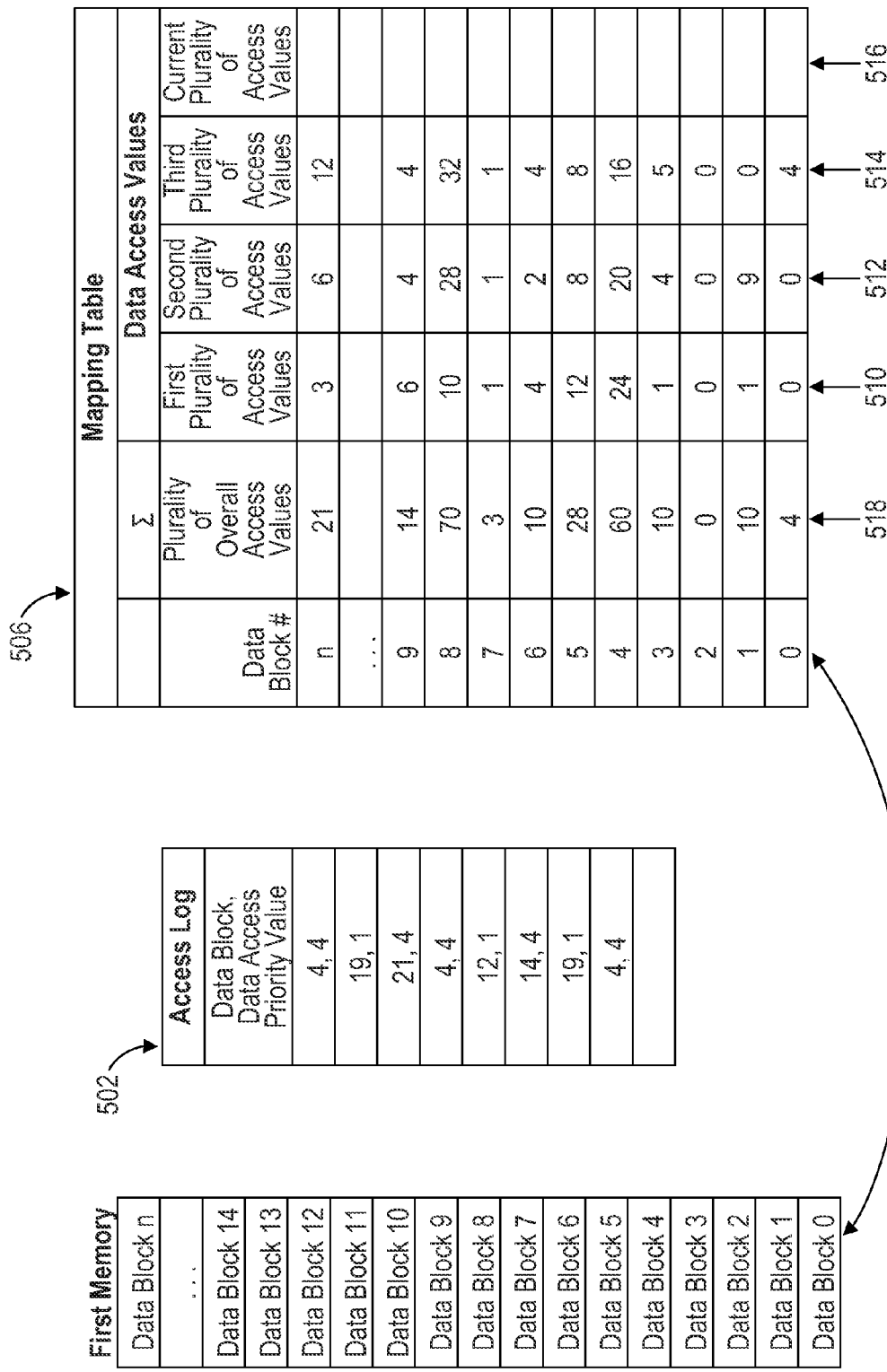
FIG. 5 shows an example of an access log storing data access priority values and a mapping table according to an embodiment.

FIG. 5 shows an example of access log 502 for determining data access priority values and mapping table 506. The first memory (e.g., the disk storage of disk pack 134) is divided into n data blocks 508 numbered 0, 1, n. The size and number of data blocks 508 can be determined based on design concerns. Because tracking access of numerous small blocks (such as a 512-byte LBA) can be complex, access within larger data blocks can be tracked. For example, each data block may include 128 kilobytes of data (or 256 LBAs).

Each time an LBA within one of the data blocks 508 is read or accessed, a data access priority value for the corresponding data block 508 is determined and stored in access log 502. The data access priority values are based on the frequency of access of data in the corresponding data block and an importance (and/or priority) of the access from a caching management perspective. In one embodiment, access by a user of DSD 106 is assigned a higher data access priority value than access by a background task that is not directly activated by the user. For example, a user access can be a direct request by a user to run a software application stored in DSD 106. A background task can be, for example, a virus scan software scanning data in DSD 106 on a periodic basis without a current user request to access data stored in a given data block 508.

In the examples described with respect to FIGS. 5-11, a single user access of data within a data block 508 is associated with a data access priority value of 4, and access resulting from a background task is associated with a data access priority value of 1. Data access priority values other than 4 and 1 can be assigned depending on design concerns. For example, less or more emphasis can be placed on user access by increasing or decreasing the data access priority value associated with user access relative to background access. In other embodiments, data access priority values can vary among different types of user accesses or among different types of background accesses. In other embodiments, data access priority values can be further based on other factors that distinguish data from a cache memory management perspective. For example, the data access priority value can depend on a type of file accessed.

A current access value for a given data block 508 is determined based on a sum of the data access priority values of access log 502 for data access during the current period. In one embodiment, access log 502 is evaluated periodically and the data access priority values for a given data block are summed periodically. The data access priority values can be summed periodically after a certain time period has passed or after certain amount of data has been written. Alternatively, the summation can be performed instantaneously.

Figure 6:
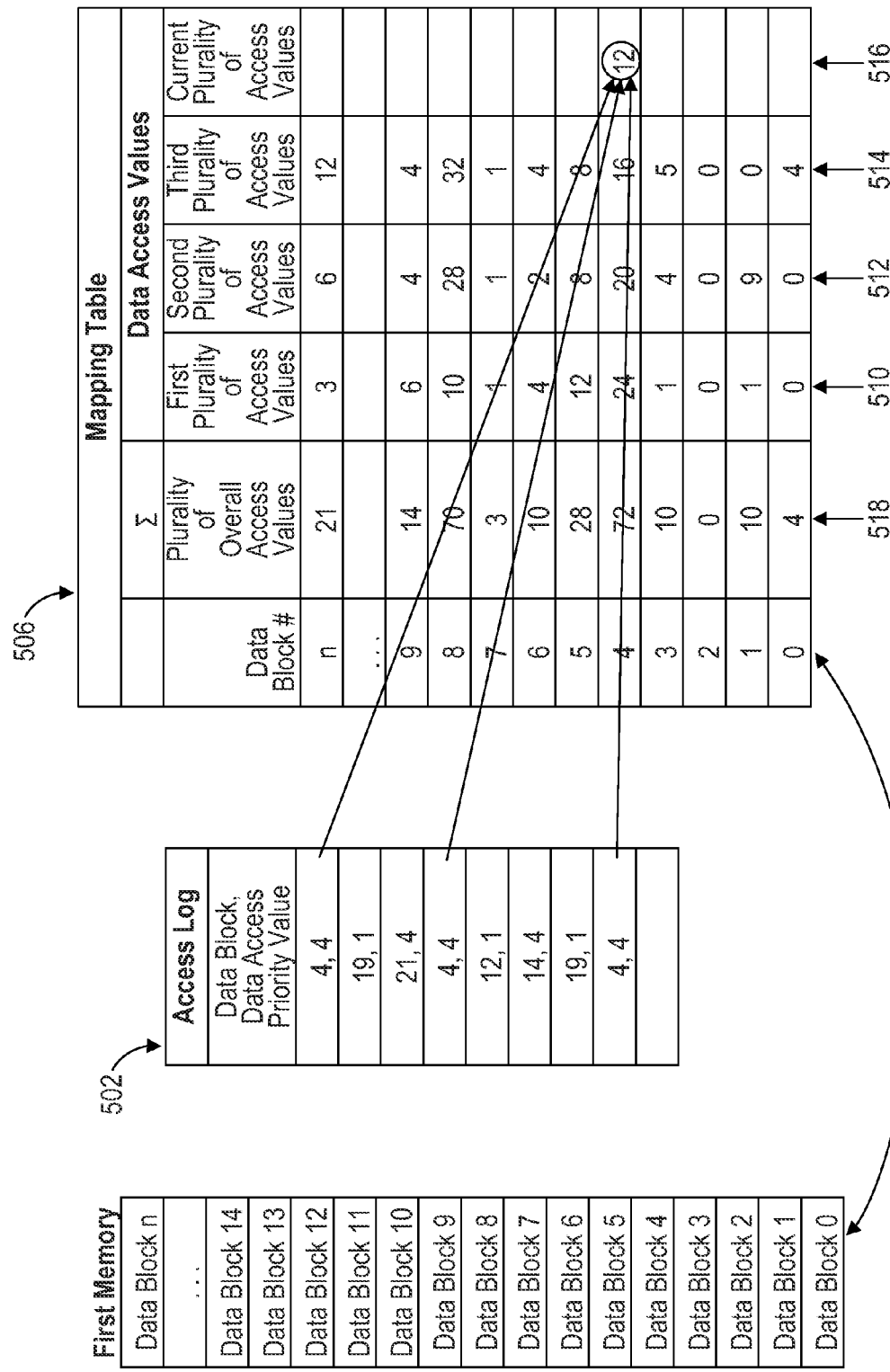
FIG. 6 shows an example of the mapping table and access log of FIG. 5 after determining a current access value for a data block according to an embodiment.

FIG. 6 shows an example of mapping table 506 after determining a current access value 516 for data block number 4. Data block number 4 is accessed three times directly by a user during a current time period, resulting in a current access value of 12 for the current time period, as indicated by arrows for illustration purposes. Although four time periods are discussed herein, data access during less or more number of time periods can be tracked based on design concerns, such as available storage space and/or importance of old access values from a cache memory management perspective. In other embodiments, a time period may be a fraction of a day, multiple days, or any other time period based on design concerns. In other embodiments, instead of keeping track of data access during different time periods, subsequent access values are determined after a certain amount of data is written to DSD 106 or NVSM 142.

FIG. 7 shows mapping table 506 after a current plurality of access values 516 are determined. The current plurality of access values 516 correspond to the plurality of data blocks 508, respectively.

In block 304 of FIG. 3, the processor removes the oldest access values. For example, the first plurality of access values 510 for a first time period are removed. The first plurality of access values 510 correspond to data access of a plurality of data blocks 508, respectively, during a first time period. FIG. 8 shows mapping table 506 with a removed column (encompassed by a solid box for illustration purposes). The removed column previously held the first plurality of access values 510. The removed column frees space for storing age-adjusted access values.

In block 306, the processor adjusts the first plurality of access values 510 based on a second plurality of access values 512 and a first aging weight. The second plurality of access values 512 correspond to data access of a plurality of data blocks 508, respectively, during the second time period. The first aging weight may be, for example, a factor of 2 such that each of the second plurality of access values 512 are divided by two (2) and stored as the first plurality of access values 510. The first aging weight may be expressed in terms of percentage (e.g., 50%) or other values based on design concerns. The adjusted first plurality of access values 510 are encompassed by a block in FIG. 9 for illustration purposes. For example, after age adjustment using an aging weight of 2, data block 9 has a corresponding first access value of 2 for the first time period (which is half of second access value of 4 for the second time period). The aging process can be performed periodically, for example, every day. In another embodiment, the age-adjusted access values can be updated instantaneously. In yet another embodiment, the aging process can be performed after certain amount of data is written to NVSM 142 or DSD 106.

In block 308, the processor adjusts the second plurality of access values 512 based on the third plurality of access values 514 and the first aging weight or another aging weight similarly to the process in block 306. The third plurality of access values 514 correspond to data access of a plurality of data blocks 508, respectively, during the third time period.

In block 310, the processor adjusts the third plurality of access values 514 based on the current plurality of access values 516 and the first aging weight or another aging weight similarly to the process in block 306.

As shown in FIG. 10, the plurality of access values for a given time period include the plurality of access values for the next more recent time period weighted by the first aging weight (e.g., 2). In this example, the same first aging weight is utilized for aging access values with respect to the next recent access value. In other embodiments, the aging weight for determining a plurality of access values in a time period may differ from another aging weight for determining another plurality of access values in a different time period.

In block 312, the processor removes the current plurality of access values for storing new access values. As shown in FIG. 11, the current plurality of access values are set to zero or removed (as shown within the solid box indicated for illustration purposes). One reason for removal is that there may be a certain memory allocated for recording access values, and the oldest values are removed to free space for entry of new access values. Another reason for removal may be that the very oldest values after certain number of time periods have passed may be no longer of interest.

In block 314, the processor determines a plurality of overall access values 518 for the plurality of data blocks, respectively, based on the age-adjusted first, second, third plurality of access values 510, 512, and 514, and the current plurality of access values 516. For example, as shown in FIG. 11, an overall access value 518 for a given data block 508 is the sum of the corresponding age-adjusted first, second, and third access values 510, 512, and 514, and the current access value 516. Although FIG. 3 shows block 314 appearing after blocks 302-312, block 314 is not necessarily performed after blocks 302-312. In one embodiment, the access values 510, 512, 514, and 516 for a given data block 508 are summed periodically. The access values 510, 512, 514, and 516 can be summed periodically after a certain time period has passed or after certain amount of data has been written. Alternatively, the summation can be performed instantaneously to obtain the plurality of overall access values 518.

In block 316, the processor selects at least one data block of the plurality of data blocks 508 to be copied or transferred from disk pack 134 and stored in cache memory 18 of NVSM 142 based on the corresponding overall access value 518. Eviction of data from cache memory 18 and addition of data from disk pack 134 to cache memory 18 can be based on the plurality of access values 518.

For example, cache memory 18 of NVSM 142 has space for a certain number of data blocks 508 (e.g., 200 data blocks). Therefore, 200 data blocks with the greatest overall access values 518 will be stored in cache memory 18. If there is no space remaining in cache memory 18, data blocks with the lowest access values in cache memory 18 can be evicted from cache memory 18 and replaced with data blocks with higher access values. Therefore, the determination of whether a data block is transferred or copied to cache memory 18 depends on how the data block ranks in terms of access value relative to other data blocks 508. Data blocks 508 with the highest overall access values (relative to other data blocks) are transferred or copied from the first memory (e.g., disk pack 134) to the discretionary storage of the second memory (e.g., cache memory 18 of NVSM 142). In one embodiment, as the end of a write life of NVSM 142 is approached, the processor can evict data blocks to avoid cache write-throughs. Write-throughs are writes to data already in cache memory 18 which deteriorates the remaining practical usable life of NVSM 142.

In block 318, the processor adjusts at least one of the first aging weight or another aging weight based on the remaining practical usable life of the second memory (e.g., NVSM 142). In one embodiment, the processor of host 101 takes into account certain data for adjusting the aging weight. The processor has access to a current date and a predetermined time period. The predetermined time period may be a time period provided in a specification or a warranty time period. The processor can have access to manufacturing date and/or a first use date of DSD 106. The first use date may be based on when DSD 106 was registered or based on telemetric data received about first use of NVSM 142. The processor can determine what portion of the predetermined time period or another benchmark for remaining life of NVSM 142 is remaining based on the current date, the date of manufacturing or first use, and the predetermined time period. The processor may also take into account the shelf time before usage.

The processor further determines expected remaining practical usable life of NVSM 142. The remaining practical usable life is reflective of health of NVSM 142 and available data blocks in NVSM 142. In one implementation, the remaining practical usable life of NVSM 142 can be determined using telemetric data received, for example, from a monitoring system. The monitoring system can monitor, detect and report various indicators of reliability that can be used to anticipate failures in NVSM 142. Such a monitoring system may be a custom system, or may be based on a standardized protocol such as Self-Monitoring, Analysis and Reporting Technology (SMART), for example. As understood by those of ordinary skill in the art, other parameters can be used in different implementations.

The pace at which the remaining practical usable life of NVSM 142 decreases depends on the frequency of updating cache memory 18 in NVSM 142. In one embodiment, the processor decreases the influence of new data in updating cache memory 18 when the processor determines that the expected remaining practical usable life of NVSM 142 is too low as compared with the remaining time of the predetermined time period or another predetermined benchmark. For example, the processor can evaluate a ratio or another relationship between the expected remaining practical usable life of NVSM 142 and the remaining time of the predetermined time period. One purpose of the evaluation is to ensure that the practical usable life of NVSM 142 extends at least beyond the predetermined time period for DSD 106 (e.g., a warranty period or a time period in the specification of DSD 106).

An aging weight of greater than one (1) (such as an aging weight of 2 in the example described above) discounts the older access values more than the more recent access values. As a result, the composition of the cache would be more influenced by new access activities which would likely lead to a high rate of change in the cache. New access patterns would significantly influence the composition of the cache, leading to faster update rate of cache memory 18 and more frequent writes to NVSM 142. When an aging weight of two (2) is utilized, access value of each time period has twice the value of the next older time period. In effect, the current, third, second, and first plurality of access values are assigned relative weights of 100%, 50%, 25%, and 12.5%, respectively.

The aging weight can be adjusted to be lower to decrease the rate at which the practical usable life of NVSM 142 deteriorates. As the aging weight reduces, influence of new access patterns on updating cache memory 18 decreases, resulting in less writes to NVSM 142. An aging weight of one (1) would mean that the older weight values are not diminished at all, while an aging weight of less than one (1) would amplify the influence of the older weight values. For example, if it is determined that although two years are left from the warranty period of 5 years, the expected remaining practical life of NVSM 142 is less than 2 years, the aging weight can be decreased such that new data has less influence on updating cache memory 18. A lower update rate leads to decreasing the rate at which the practical usable life of NVSM 142 deteriorates. The aging weight can thus be dynamically adjusted to slow/quicken the churning of the cache entries to reduce/increase writes to NVSM 142.

Figure 12:
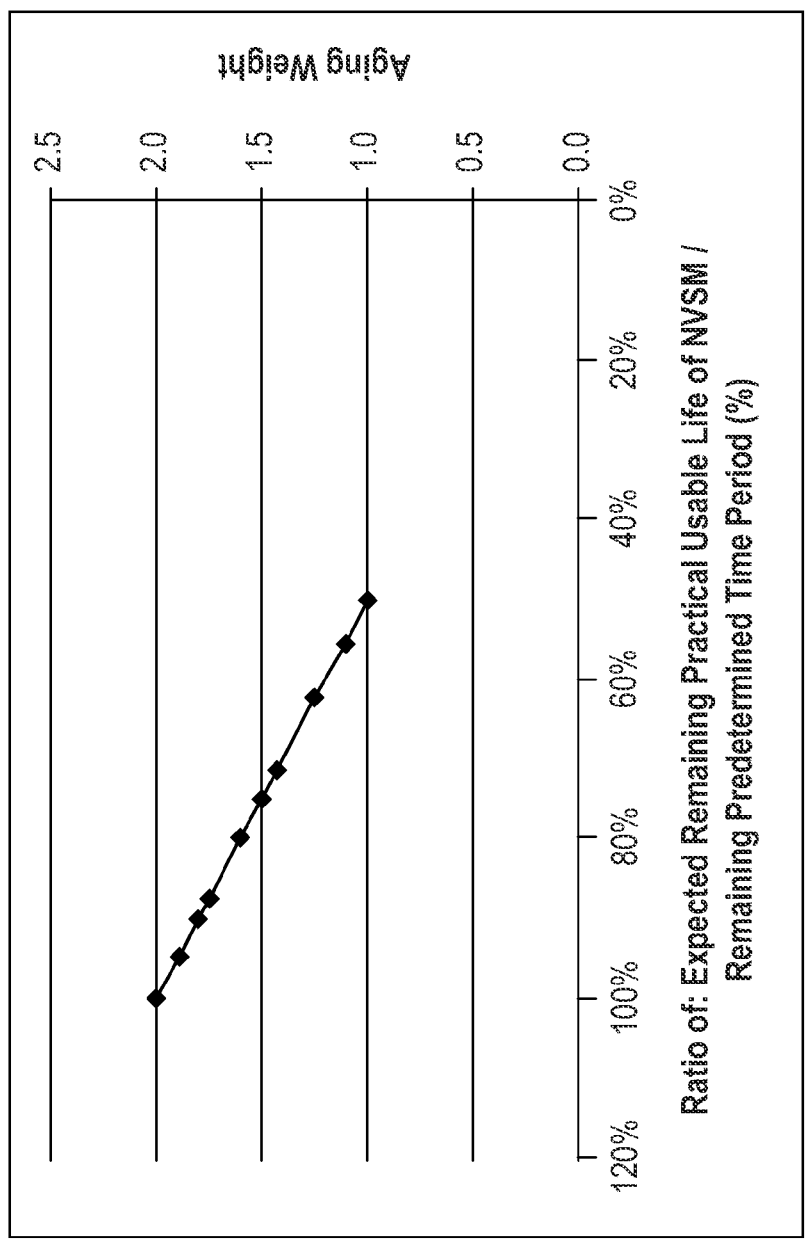
FIG. 12 is a graph illustrating a relationship between a dynamically adjusted aging weight and an expected remaining practical usable life of the NVSM according to an embodiment.

FIG. 12 is a graph illustrating an example of how an aging weight can be dynamically adjusted based on a ratio of the expected remaining life of the NVSM 142 over the remaining predetermined time period. In this example, when it is determined that the expected remaining life of NVSM 142 is equal to the remaining time period (i.e., 100% ratio), the aging weight is set to 2. In this way, less precedence is given to old activity without ignoring the old activity. The result of giving less precedence to old activity is that new access values will more heavily affect the overall access values. Therefore, the overall access values will change quickly, resulting in a higher cache churn rate. When cache memory 18 is churned or updated frequently, data is placed in and/or evicted from cache memory 18 at a higher rate. A high churn rate or cache update rate can therefore deteriorate the practical usable life of NVSM 142 at a high rate.

The aging weight can be determined using a look-up table that includes ratios corresponding to the aging weight. Alternatively, the aging weight can be determined using a look-up table that includes aging weights corresponding to two entries of the remaining practical usable life of the second memory (e.g., NVSM 142) and the remaining predetermined time period. In yet another embodiment, the processor can calculate an aging weight based on the expected remaining life of the second memory (e.g., NVSM 142) and the remaining predetermined time period.

In the embodiment shown in FIG. 12, as the ratio decreases to less than 100%, the processor reduces the aging weight. In this way, influence of new data on updating cache memory 18 is reduced and thereby, the rate at which NVSM 142 life deteriorates is reduced. For example, as the ratio reaches 95%, the aging weight is reduced to 1.9 to slightly reduce the effect of new data on updating cache.

A unique advantage of utilizing an aging weight (as opposed to merely ignoring or removing old data access values) is that the cache update rate and rate at which NVSM 142 is consumed can be managed without arbitrarily ignoring useful old data access values. The aging process does not necessarily reduce performance because the old data access values are still considered, but given a different weight for updating cache memory 18. In this way, the old data access values can be maintained and not ignored. When the aging weight is reduced, there are higher criteria set for moving new data to cache memory 18. In other words, the composition of cache memory 18 may adapt more slowly to new data. For example, when the aging weight is reduced from 2 to a lower value, a certain new software application may need to be run a greater number of times before data associated with the application is placed in cache memory 18.

The aging weight is not necessarily continuously decreased during life of NVSM 142. In certain conditions, the processor may determine that the expected remaining practical life of NVSM 142 is high as compared with the remaining time of the predetermined time period or another predetermined benchmark. For example, the processor can evaluate a ratio or another relationship between the expected remaining practical usable life of NVSM 142 and the remaining time of the predetermined time period. For example, if the ratio of the expected remaining life of the NVSM 142 over the remaining predetermined time period increases, the processor may accordingly increase the aging weight to allow new data to have a greater influence.

The processor may reset the first, second, and third age-adjusted plurality of access values 510, 512, and 514, the current plurality of access values 516, and the plurality of overall access values 518 at least for data corresponding to an operating system if the operating system is replaced or upgraded. The operating system may be stored in the first memory or the second memory. If the access values are not reset, access values for data corresponding to the old operating system may affect the plurality of overall access values 518 for a number of time periods. As a result, data corresponding to the old operating system may remain in cache memory 18 for a number of time periods. However, from a cache memory management perspective, access of data corresponding to the old operating system may no longer be of interest because the processor and the user are unlikely to access such data. To prevent this undesirable effect on the cache data makeup, the access values for data corresponding to the old operating system may be reset to zero when the operating system is replaced or upgraded.

In another embodiment, the aging weight remains constant and relatively high for a certain initial time period since the initial use of DSD 106. For example, the aging weight can be set to 2 for the first year of use to allow for more reactive caching during the initial first year use.

Figure 4:
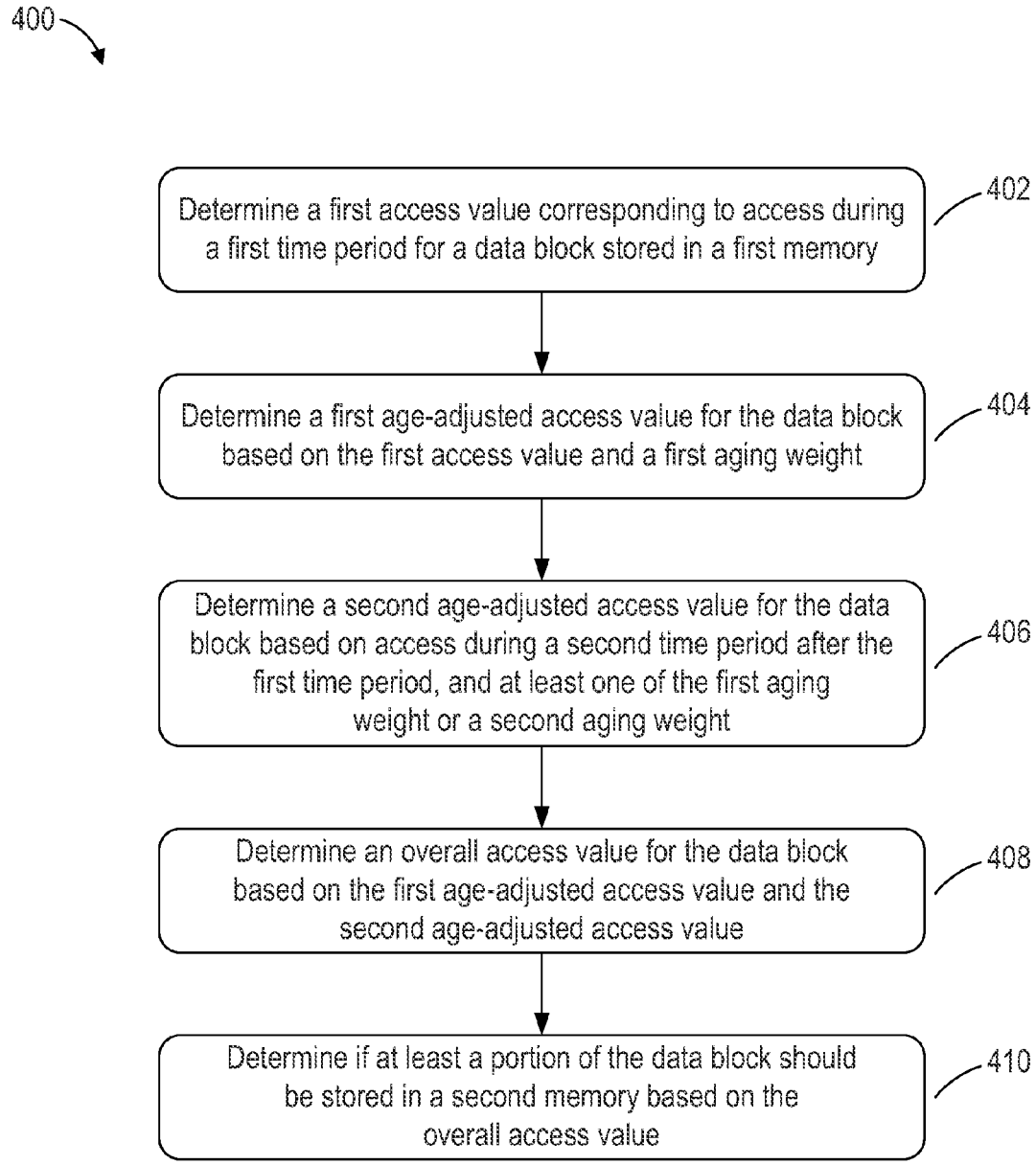
FIG. 4 is a flowchart depicting a memory life management process that adjusts a cache update rate using at least one aging weight according to an embodiment.

FIG. 4 is a flowchart depicting a memory life management process by adjusting a cache update rate according to an embodiment. In block 402, a processor on host 101 determines a first access value corresponding to access during a first time period for a first data block stored in a first memory (e.g., disk pack 134).

In block 404, the processor determines a first age-adjusted access value based on the first access value and a first aging weight. In block 406, the processor determines a second age-adjusted access value based on access during a second time period after the first time period, based on at least one of the first aging weight or a second aging weight. Block 406 may be performed before or after block 404. That is, the first access value can be aged before or after determining the second age-adjusted access value. The aging weight can be adjusted similar to block 324 described above.

In block 408, the processor determines an overall access value for the first data block based on the first age-adjusted access value and the second age-adjusted access value. In block 410, the processor determines if at least a portion of the first data block should be stored in, for example, a cache memory of a second memory (e.g., cache memory 18 of NVSM 142) based on the overall access value. As discussed above, the determination of whether at least a portion of the first data block should be stored in cache memory 18 can be made by comparing the overall access value for the first data block with the overall access values for data already stored in cache memory 18. If the overall access value for the first data block is greater than the overall access value for data already stored in cache memory 18, the first data block or a portion thereof are transferred or copied to cache memory 18 to replace the data with a lower overall access value.

In the embodiments described above with respect to FIGS. 3-11, at least a portion of or the entire process is performed by a processor of host 101. The functions can be performed using a driver, specialized software, or any other software. In other embodiments, at least a portion of or the entire process described above with respect to FIGS. 3-11 can be performed by controller 120 depending on design considerations. The process can be performed by DSD firmware 14, DSD driver 12, application 16, specialized software and/or any other software. Similarly, controller 120 can have access to current date, manufacture or first use date, remaining practical usable life of NVSM 142, and the predetermined time period. Because controller 120 may have access to smaller memories (such as DRAM) and may have computational limitations, block sizes can be reduced in the implementation that utilizes controller 120.

In other embodiments, the process described above with respect to FIGS. 3-11 can be applied to any system utilizing different data storage units and discretionary storage similar to cache memory 18. At least a portion of or the entire process described above with respect to FIGS. 3-11 can be performed in a tiered storage system that utilizes two or more pools of memories that may or may not be co-located. Each pool may include different types of memories. Each pool can include solely NVSMs, solely disk packs, or a combination of NVSMs, disk packs, and/or other types of memories. One or more of the pools of memory can include discretionary storage similar to cache memory 18. Update rate of the discretionary storage can be managed using the process described above. Access values for data accessed during previous time periods may be aged using one or more aging weights. Data are selected to be transferred or copied from a first pool of memory to discretionary storage in a second pool of memory based on aged access values.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A host configured to communicate with a data storage system including a first memory for storing data and a second memory for storing data, the host comprising a processor configured to:

determine a first access value corresponding to access during a first time period for a data block stored in the first memory;

determine a first age-adjusted access value for the data block based on the first access value and a first aging weight;

determine a second age-adjusted access value for the data block based on access during a second time period after the first time period and at least one of the first aging weight or a second aging weight;

determine an overall access value for the data block based on the first age-adjusted access value and the second age-adjusted access value;

store at least a portion of the data block in the second memory based on a comparison between the overall access value for the data block and at least one determined overall access value for at least one other data block currently stored in the second memory; and adjust at least one of the first aging weight or the second aging weight based on an expected remaining practical usable life of the second memory, wherein adjusting at least one of the first aging weight or the second aging weight decreases the rate at which the practical usable life of the second memory deteriorates.

2. The host of claim 1, wherein the first memory includes a disk, and the second memory includes a non-volatile semiconductor memory (NVSM).

3. The host of claim 2, wherein the processor is further configured to adjust at least one of the first aging weight or the second aging weight based on a relationship between an expected remaining practical usable life of the NVSM and a remaining predetermined time period.

4. The host of claim 1, wherein the processor is further configured to:

determine a current access value for the data block based on access during a current time period after the second time period;

determine a third age-adjusted access value for the data block based on the current access value and at least one of the first aging weight, the second aging weight, or another aging weight; and determine the overall access value for the data block based on the first age-adjusted access value, the second age-adjusted access value, and the third age-adjusted access value.

5. The host of claim 4, wherein the processor is further configured to:

replace a previous access value, stored in the data storage system for a previous time period before the first time period, with the first age-adjusted access value;

replace the first access value with the second age-adjusted access value;

replace the second access value with the third age-adjusted access value; and remove the current access value in order to store new access values.

6. The host of claim 1, wherein the processor is further configured to:

store a data access priority value in an access log each time the data block is accessed, the stored data access priority value being greater for access of the data block by a user of the data storage system than access of the data block by a software application without a user request; and determine the current access value for the data block based on data access priority values stored in the access log for the current time period.

7. The host of claim 1, wherein the processor is further configured to:

replace a previous access value, stored in the data storage system for a previous time period before the first time period, with the first age-adjusted access value; and replace the first access value with the second age-adjusted access value.

8. The host of claim 1, wherein in adjusting at least one of the first aging weight or the second aging weight, the processor is further configured to adjust at least one of the first aging weight or the second aging weight so that the first age-adjusted access value is given more weight than the second age-adjusted access value in determining the overall access value to decrease the influence of recent access patterns of the data block in determining if at least a portion of the data block should be stored in the second memory.

9. A method of operating a data storage system including a first memory for storing data and a second memory for storing data, the method comprising:

determining a first access value corresponding to access during a first time period for a data block stored in the first memory;

determining a first age-adjusted access value for the data block based on the first access value and a first aging weight;

determining a second age-adjusted access value for the data block based on access during a second time period after the first time period and at least one of the first aging weight or a second aging weight;

determining an overall access value for the data block based on the first age-adjusted access value and the second age-adjusted access value;

storing at least a portion of the data block in the second memory based on a comparison between the overall access value for the data block and at least one determined overall access value for at least one other data block currently stored in the second memory; and adjusting at least one of the first aging weight or the second aging weight based on an expected remaining practical usable life of the second memory, wherein adjusting at least one of the first aging weight or the second aging weight decreases the rate at which the practical usable life of the second memory deteriorates.

10. The method of claim 9, wherein the first memory includes a disk, and the second memory includes a non-volatile semiconductor memory (NVSM).

11. The method of claim 10, further comprising:

adjusting at least one of the first aging weight or the second aging weight based on a relationship between an expected remaining practical usable life of the NVSM and a remaining predetermined time period.

12. The method of claim 9, further comprising:

determining a current access value for the data block based on access during a current time period after the second time period;

determining a third age-adjusted access value for the data block based on the current access value and at least one of the first aging weight, the second aging weight, or another aging weight; and determining the overall access value for the data block based on the first age-adjusted access value, the second age-adjusted access value, and the third age-adjusted access value.

13. The method of claim 12, further comprising:

storing a data access priority value in an access log each time the data block is accessed, the stored data access priority value being greater for access of the data block by a user of the data storage system than access of the data block by a software application without a user request; and determining the current access value for the data block based on data access priority values stored in the access log for the current time period.

14. The method of claim 12, further comprising:

replacing a previous access value, stored in the data storage system for a previous time period before the first time period, with the first age-adjusted access value;

replacing the first access value with the second age-adjusted access value;

replacing the second access value with the third age-adjusted access value; and removing the current access value in order to store new access values.

15. The method of claim 9, further comprising:

replacing a previous access value, stored in the data storage system for a previous time period before the first time period, with the first age-adjusted access value; and replacing the first access value with the second age-adjusted access value.

16. The method of claim 9, further comprising:

resetting the first age-adjusted access value, the second age-adjusted access value, and the overall access value for data corresponding to an operating system stored in the first memory or the second memory if the operating system is replaced or upgraded.

17. The method of claim 9, wherein at least one of the first aging weight or the second aging weight is adjusted so that the first age-adjusted access value is given more weight than the second age-adjusted access value in determining the overall access value to decrease the influence of recent access patterns of the data block in determining if at least a portion of the data block should be stored in the second memory.

18. A data storage device (DSD), comprising:

a first memory for storing data;

a second memory for storing data; and a controller configured to:

determine a first access value corresponding to access during a first time period for a data block stored in the first memory;

determine a first age-adjusted access value for the data block based on the first access value and a first aging weight;

determine a second age-adjusted access value for the data block based on access during a second time period after the first time period and at least one of the first aging weight or a second aging weight;

determine an overall access value for the data block based on the first age-adjusted access value and the second age-adjusted access value;

store at least a portion of the data block in the second memory based on a comparison between the overall access value for the data block and at least one determined overall access value for at least one other data block currently stored in the second memory; and adjust at least one of the first aging weight or the second aging weight based on an expected remaining practical usable life of the second memory, wherein adjusting at least one of the first aging weight or the second aging weight decreases the rate at which the practical usable life of the second memory deteriorates.

19. The DSD of claim 18, wherein the first memory includes a disk, and the second memory includes a non-volatile semiconductor memory (NVSM).

20. The DSD of claim 19, wherein the controller is further configured to adjust at least one of the first aging weight or the second aging weight based on a relationship between an expected remaining practical usable life of the NVSM and a remaining predetermined time period.

21. The DSD of claim 18, wherein the controller is further configured to:

determine a current access value for the data block based on access during a current time period after the second time period;

determine a third age-adjusted access value for the data block based on the current access value and at least one of the first aging weight, the second aging weight, or another aging weight; and determine the overall access value for the data block based on the first age-adjusted access value, the second age-adjusted access value, and the third age-adjusted access value.

22. The DSD of claim 21, wherein the controller is further configured to:

store a data access priority value in an access log each time the data block is accessed, the stored access value being greater for access of the data block by a user of the DSD than access of the data block by a software application without a user request; and determine the current access value for the data block based on data access priority values stored in the access log for the current time period.

23. The DSD of claim 21, wherein the controller is further configured to:

replace a previous access value, stored in the DSD for a previous time period before the first time period, with the first age-adjusted access value;

replace the first access value with the second age-adjusted access value;

replace the second access value with the third age-adjusted access value; and remove the current access value in order to store new access values.

24. The DSD of claim 18, wherein the controller is further configured to:

replace a previous access value, stored in the DSD for a previous time period before the first time period, with the first age-adjusted access value; and replace the first access value with the second age-adjusted access value.

25. The DSD of claim 18, wherein the controller is further configured to:

reset the first age-adjusted access value, the second age-adjusted access value, and the overall access value for data corresponding to an operating system stored in the first memory or the second memory if the operating system is replaced or upgraded.

26. The DSD of claim 18, wherein in adjusting at least one of the first aging weight or the second aging weight, the controller is further configured to adjust at least one of the first aging weight or the second aging weight so that the first age-adjusted access value is given more weight than the second age-adjusted access value in determining the overall access value to decrease the influence of recent access patterns of the data block in determining if at least a portion of the data block should be stored in the second memory.

* * * * *